United States Patent
Sahlin et al.

(10) Patent No.: US 9,907,038 B2
(45) Date of Patent: Feb. 27, 2018

(54) SYNCHRONIZATION IN WIRELESS COMMUNICATIONS NETWORKS

(71) Applicant: Telefonaktiebolaget L M Ericsson (PUBL), Stockholm (SE)

(72) Inventors: Henrik Sahlin, Mölnlycke (SE); Pål Frenger, Linköping (SE); Martin Hessler, Linköping (SE); Erik Eriksson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 131 days.

(21) Appl. No.: 14/429,500

(22) PCT Filed: Mar. 17, 2015

(86) PCT No.: PCT/EP2015/055594
§ 371 (c)(1),
(2) Date: Mar. 19, 2015

(87) PCT Pub. No.: WO2016/146177
PCT Pub. Date: Sep. 22, 2016

(65) Prior Publication Data
US 2017/0048810 A1    Feb. 16, 2017

(51) Int. Cl.
*H04W 56/00* (2009.01)
*H04L 5/00* (2006.01)
*H04L 27/26* (2006.01)

(52) U.S. Cl.
CPC ......... *H04W 56/001* (2013.01); *H04L 5/0048* (2013.01); *H04L 27/26* (2013.01); *H04W 56/0045* (2013.01)

(58) Field of Classification Search
CPC ............ H04W 56/001; H04W 56/0045; H04L 5/0048; H04L 27/26
(Continued)

(56) References Cited

U.S. PATENT DOCUMENTS

2008/0095254 A1* 4/2008 Muharemovic ....... H04L 5/0053
                                                              375/260
2011/0085509 A1* 4/2011 Park ..................... H04W 74/08
                                                              370/329
(Continued)

FOREIGN PATENT DOCUMENTS

WO    2014196908 A1    12/2014
WO    2014209204 A1    12/2014
(Continued)

OTHER PUBLICATIONS

International Search Report and the Written Opinion of the International Searching Authority, issued in corresponding International Application No. PCT/EP2015/055594, dated Nov. 27, 2015, 12 pages.

*Primary Examiner* — Marsha D. Banks Harold
*Assistant Examiner* — Natasha W Cosme
(74) *Attorney, Agent, or Firm* — Rothwell, Figg, Ernst & Manbeck, P.C.

(57) ABSTRACT

There is provided mechanisms for synchronization in a wireless communications network. A method is performed by a transmitting device. The method comprises transmitting a first synchronization signal on a first time/frequency resource in a time/frequency grid. The method comprises receiving a response to the first synchronization signal from a receiving device. The method comprises transmitting a second synchronization signal on a second time/frequency resource in the time/frequency grid to the receiving device, wherein the second time/frequency resource spans a larger portion of the time/frequency grid than the first time/frequency resource.

26 Claims, 6 Drawing Sheets

(58) Field of Classification Search
USPC .......................................................... 379/329
See application file for complete search history.

(56) References Cited

U.S. PATENT DOCUMENTS

2011/0151867 A1* 6/2011 Hirano .................. H04W 8/183
455/434
2016/0142241 A1 5/2016 Sahlin et al.

FOREIGN PATENT DOCUMENTS

| WO | 2015028081 A1 | 3/2015 |
| WO | 2015144208 A1 | 10/2015 |
| WO | 2015144256 A1 | 10/2015 |

* cited by examiner

SYNCHRONIZATION IN WIRELESS COMMUNICATIONS NETWORKS

CROSS REFERENCE TO RELATED APPLICATION(S)

This application is a 35 U.S.C. § 371 National Phase Entry Application from PCT/EP2015/055594, filed Mar. 17, 2015, designating the United States, the disclosure of which is incorporated herein in its entirety by reference.

TECHNICAL FIELD

Embodiments presented herein relate to wireless communications networks, and particularly to methods, a transmitting device, a receiving device, computer programs, and a computer program product for synchronization in a wireless communications network.

BACKGROUND

In communications networks, there may be a challenge to obtain good performance and capacity for a given communications protocol, its parameters and the physical environment in which the communications network is deployed.

For example, when a wireless device is powered on, or when it moves between cells in a cellular communications network, the wireless devices receives and synchronizes to downlink signals (i.e., signals transmitted from a network node serving the cell) in a cell search procedure. One purpose of this cell search procedure is to identify the best cell according to some quality requirement and to achieve time and frequency synchronization to the cellular communications network in the downlink.

A simplified and typical initial cell search procedure as exemplified by the Long Term evolution (LTE) Release 8 will be summarized next. A wireless device has typically a frequency error of 2 to 20 ppm (Part Per Million) at power on. This corresponds to 40 to 400 kHz frequency error at a carrier frequency of 2 GHz.

Primary Synchronization Signals (PSS) and Secondary Synchronization Signals (SSS) are by the wireless device used during the cell search procedure. In the case of frequency division duplex (FDD), the PSS is transmitted in the last orthogonal frequency-division multiplexing (OFDM) symbol of slots 0 and 10 within a frame and the SSS is transmitted in the OFDM symbol preceding PSS. In the case of time division duplex (TDD), the PSS is transmitted in the third OFDM symbol of slots 3 and 13 within a frame, and the SSS is transmitted in the last OFDM symbol of slots 2 and 12, i.e., three symbols ahead of the PSS.

The wireless device then tries to detect the PSS from which it can derive the cell ID within a cell-identity group, which consists of three different cell identities corresponding to three different PSS. During this detection, the wireless device thus has to blindly search for all of these three possible cell identities. The UE also achieves OFDM symbol synchronization and a coarse frequency offset estimation with an accuracy of about 1 kHz. The latter is estimated by the wireless device by evaluating several hypotheses of the frequency error.

The wireless device can then continue to detect the SSS from which it acquires the physical cell ID and achieves radio frame synchronization. Here, the wireless device also detects if a normal or extended cyclic prefix is used. If the wireless device is not preconfigured for one of FDD or TDD, the wireless device can detect the duplex mode (i.e., FDD or TDD) by the position in the frame of the detected SSS in relation to the detected PSS. Fine frequency offset estimation can be estimated by correlating the PSS and the SSS. Alternatively, such fine frequency offset estimation is estimated by the wireless device using Cell specific Reference Signals (CRS).

After these synchronizations, the wireless device can receive and decode a Master Information Block (MIB) which is transmitted on the Physical Broadcast Channel (PBCH).

The number of OFDM symbols used for the Physical Downlink Control Channel (PDCCH) is signaled by the Physical Control Format Indicator Channel (PCFICH). This PCFICH must thus be decoded before the wireless device can receive the PDCCH. Here, the number of OFDM symbols as signaled by PCFICH can be 1, 2 or 3 for large bandwidth allocations (more than 10 resource blocks), and 2, 3 or 4 OFDM symbols for small bandwidths (less than or equal to 10 RB). The first OFDM symbols of a sub-frame are used for PDCCH.

Additional broadcasted information is transmitted in the System-Information Blocks (SIBs) which are carried by the PDSCH. This PDSCH can by the wireless device be decoded after reading the PCFICH and the PDCCH. Here, the second SIB, denoted SIB2, includes information regarding uplink cell bandwidth and random access configurations. Thus, after successful decoding of SIB2, the wireless device can transmit a preamble on the PRACH and receive a random access response (RAR) on the PDSCH.

Formats of initial synchronization signals which utilize many time resources have been proposed for future wireless systems. In general terms, these formats are based on several transmissions of the PSS and SSS sequences. For example, the same PSS sequence may be repeated four times within a sub frame such that the receiver of the PSS can accumulate the received PSS either coherently or non-coherently. For communications networks using many antennas and which rely on beamforming for good link budget, the PSS may be beamformed with different beamformers in the different OFDM symbols.

A PRACH preamble has been suggested that is based on a short sequence of the same length as the length of the OFDM symbols used for all other physical channels. The preamble sequence is created by repeating the short sequence a number of times. A receiver structure for this preamble format uses a Fast Fourier Transform (FFTs) of the same size as for other uplink channels and signals. In the receiver for the PRACH preamble, several received signals from different FFT windows can be combined. Different combinations of these FFT windows are proposed depending of the amount of phase noise, frequency errors, and speed at which the wireless device is moving. By using this proposed preamble format, a detection of PRACH is achieved which is more robust against frequency errors as compared to the preamble format in LTE release 8.

Several broadcasted signals and channels are always transmitted in LTE release 8, where these transmissions occupy a significant fraction of the available bandwidth. With the use of repeated or beamformed synchronization signals, the overhead is further increased. These signals and channels are transmitted independent of the traffic load, or numbers of users, in LTE release 8 based communications networks.

Hence, there is still a need for an improved synchronization in a wireless communications network.

SUMMARY

An object of embodiments herein is to provide efficient synchronization in a wireless communications network.

According to a first aspect there is presented a method for synchronization in a wireless communications network. The method is performed by a transmitting device. The method comprises transmitting a first synchronization signal on a first time/frequency resource in a time/frequency grid. The method comprises receiving a response to the first synchronization signal from a receiving device. The method comprises transmitting a second synchronization signal on a second time/frequency resource in the time/frequency grid to the receiving device, wherein the second time/frequency resource spans a larger portion of the time/frequency grid than the first time/frequency resource.

Advantageously this provides efficient synchronization in a wireless communications network.

Advantageously this provides efficient utilization of resources in the transmitting device.

Advantageously this provides efficient resource allocation of synchronization signals.

Advantageously this enables adaptation of the resources needed for initial access, such as during a medium access control procedure.

According to a second aspect there is presented a transmitting device for synchronization in a wireless communications network. The transmitting device comprises a processing unit. The processing unit is configured to cause the transmitting device to transmit a first synchronization signal on a first time/frequency resource in a time/frequency grid. The processing unit is configured to cause the transmitting device to receive a response to the first synchronization signal from a receiving device. The processing unit is configured to cause the transmitting device to transmit a second synchronization signal on a second time/frequency resource in the time/frequency grid to the receiving device, wherein the second time/frequency resource spans a larger portion of the time/frequency grid than the first time/frequency resource.

According to a third aspect there is presented a computer program for synchronization in a wireless communications network, the computer program comprising computer program code which, when run on a processing unit of a transmitting device, causes the transmitting device to perform a method according to the first aspect.

According to a fourth aspect there is presented a method for synchronization in a wireless communications network. The method is performed by a receiving device. The method comprises receiving a first synchronization signal on a first time/frequency resource in a time/frequency grid from a transmitting device. The method comprises transmitting a response to the first synchronization signal. The method comprises receiving a second synchronization signal on a second time/frequency resource in the time/frequency grid from the transmitting device, wherein the second time/frequency resource spans a larger portion of the time/frequency grid than the first time/frequency resource.

According to a fifth aspect there is presented a receiving device for synchronization in a wireless communications network. The receiving device comprises a processing unit. The processing unit is configured to cause the receiving device to receive a first synchronization signal on a first time/frequency resource in a time/frequency grid from a transmitting device. The processing unit is configured to cause the receiving device to transmit a response to the first synchronization signal. The processing unit is configured to cause the receiving device to receive a second synchronization signal on a second time/frequency resource in the time/frequency grid from the transmitting device, wherein the second time/frequency resource spans a larger portion of the time/frequency grid than the first time/frequency resource.

According to a sixth aspect there is presented a computer program for synchronization in a wireless communications network, the computer program comprising computer program code which, when run on a processing unit of a receiving device, causes the receiving device to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
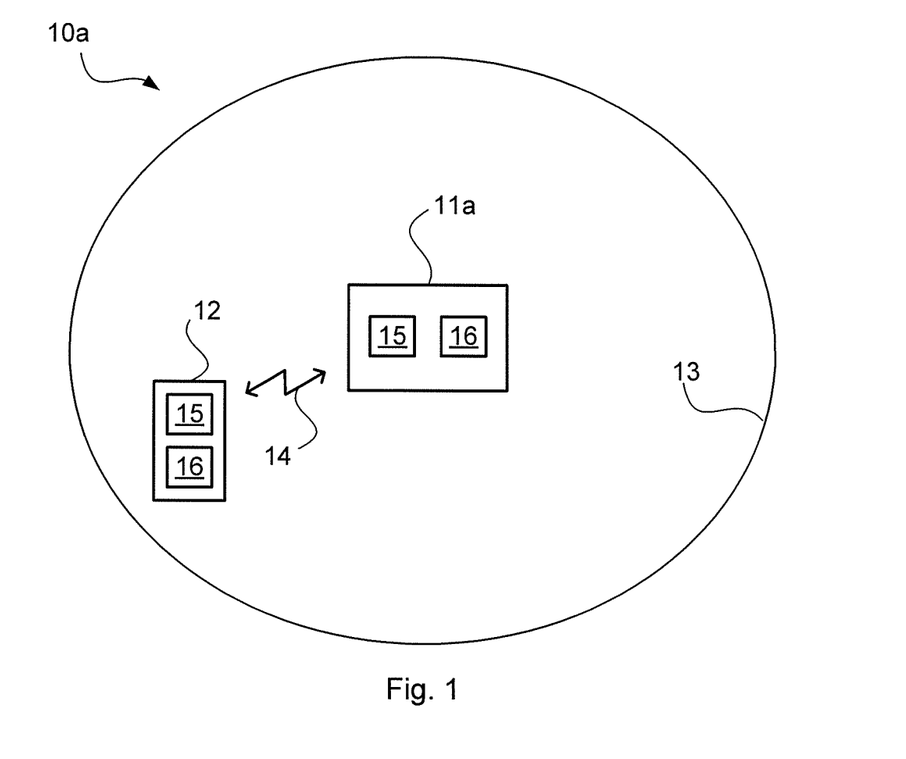
FIG. 1 is a schematic diagram illustrating a communication network according to embodiments.

FIG. 1 is a schematic diagram illustrating a communications network 10a where embodiments presented herein can be applied. The communications network 10a comprises a network node 11a. The network node 11a may be provided as radio access network node such as a radio base station; a base transceiver station; a radio network controller, a node B, or an evolved node B. The network node 11a is configured to provide network coverage to a wireless device 12 within a coverage region, or cell 13. The wireless device 12 may, for example, be a mobile station, a mobile phone, a handset, a wireless local loop phone, a user equipment (UE), a smartphone, a laptop computer, a tablet computer, or a modem. In order for the wireless device 12 to be served by the network node 11a a wireless link 14 is established between the wireless device 12 and the network node 11a.

As the skilled person understands, the communications network 10a may comprise a plurality of network nodes 11a, each serving at least one wireless device 12.

As noted above, when a wireless device 12 is powered on, or when it moves between cells 13 in a communications network 10a, the wireless device 12 receives and synchronizes to downlink signals (i.e., signals transmitted from a network node 11a serving the cell 13) in a cell search procedure.

However, as also noted above, some issues have been identified with current procedures for efficient synchronization, such as during cell search procedures, in the communications network 10a. In addition to the issues noted above, according to prior art, a fixed resource allocation is reserved for random access for wireless devices 12 which are to establish a connection with the network node 11a. The bandwidth allocation for these signals is thus not adjusted towards their use. One aspect of this is that the transmitter of the network node 11a cannot be turned off, e.g. during the night, when there are few wireless devices 12, or even none, which are to access the communications network 10a.

The embodiments disclosed herein relate to synchronization in a wireless communications network 10a. In order to obtain synchronization in a wireless communications network 10a there is provided a transmitting device 15, a method performed by the transmitting device 15, a computer program comprising code, for example in the form of a computer program product, that when run on a processing unit of the transmitting device 15, causes transmitting device 15 to perform the method. In order to obtain synchronization in a wireless communications network 10a there is further provided a receiving device 16, a method performed by the receiving device 16, and a computer program comprising code, for example in the form of a computer program product, that when run on a processing unit of the receiving device 16, causes the receiving device 16 to perform the method.

At least one of the network node 11a and the wireless device 12 therefore comprises a transmitting device 15. At least one of the network node 11a and the wireless device 12 also therefore comprises a receiving device 16. That is, if the network node 11a comprises a transmitting device 15 the wireless device 12 may comprise a receiving device 16, and vice versa. Further details of the transmitting device 15 and the receiving device 16 will be disclosed below.

Figure 2A:
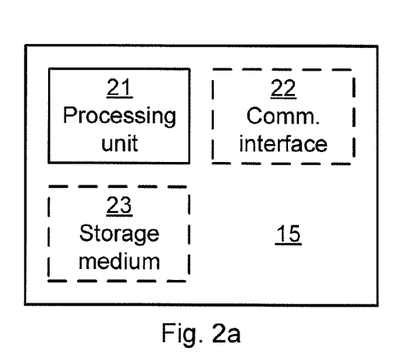
FIG. 2a is a schematic diagram showing functional units of a transmitting device according to an embodiment.

FIG. 2a schematically illustrates, in terms of a number of functional units, the components of a transmitting device 15 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 4), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The transmitting device 15 may further comprise a communications interface 22 for communications with receiving device 16. As such the communications interface 22 may comprise one or more transmitters and receivers, comprising analogue and digital components and a suitable number of antennas for wireless communications and ports for wireline communications. The processing unit 21 controls the general operation of the transmitting device 15 e.g. by sending data and control signals to the communications interface 22 and the storage medium 23, by receiving data and reports from the communications interface 22, and by retrieving data and instructions from the storage medium 23. Other components, as well as the related functionality, of the transmitting device 15 are omitted in order not to obscure the concepts presented herein.

Figure 2B:
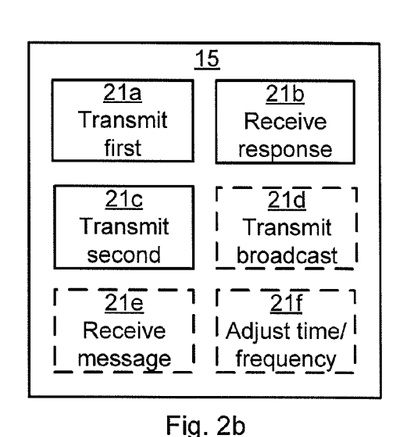
FIG. 2b is a schematic diagram showing functional modules of a transmitting device according to an embodiment.

FIG. 2b schematically illustrates, in terms of a number of functional modules, the components of a transmitting device 15 according to an embodiment. The transmitting device 15 of FIG. 2b comprises a number of functional modules; a transmit first module 21a configured to perform below step S102, a receive response module 21b configured to perform below step S106, and a transmit second module 21c configured to perform below step S108. The transmitting device 15 of FIG. 2b may further comprises a number of optional functional modules, such as any of a transmit broadcast module 21d configured to perform below step S104, a receive message module 21e configured to perform below step S110, and an adjust time and/or frequency module 21f configured to perform below step S112. The functionality of each functional module 21a-f will be further disclosed below in the context of which the functional modules 21a-f may be used. In general terms, each functional module 21a-f may be implemented in hardware or in software. Preferably, one or more or all functional modules 21a-f may be implemented by the processing unit 21, possibly in cooperation with functional units 22 and/or 23. The processing unit 21 may thus be arranged to from the storage medium 23 fetch instructions as provided by a functional module 21a-f and to execute these instructions, thereby performing any steps as will be disclosed hereinafter.

Figure 3A:
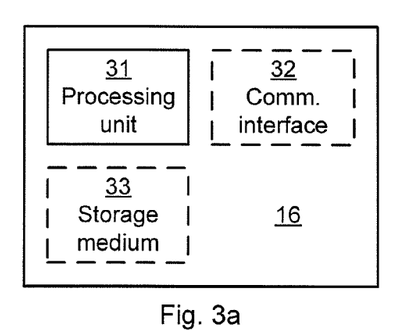
FIG. 3a is a schematic diagram showing functional units of a receiving device according to an embodiment.

FIG. 3a schematically illustrates, in terms of a number of functional units, the components of a receiving device 16 according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41b (as in FIG. 4), e.g. in the form of a storage medium 33. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The receiving device 16 may further comprise a communications interface 32 for communications with transmitting device 15. As such the communications interface 32 may comprise one or more transmitters and receivers, comprising analogue and digital components and a suitable number of antennas for wireless communications and ports for wireline communications. The processing unit 31 controls the general operation of the receiving device 16 e.g. by sending data and control signals to the communications interface 32 and the storage medium 33, by receiving data and reports from the communications interface 32, and by retrieving data and instructions from the storage medium 33. Other components, as well as the related functionality, of the receiving device 16 are omitted in order not to obscure the concepts presented herein.

Figure 3B:
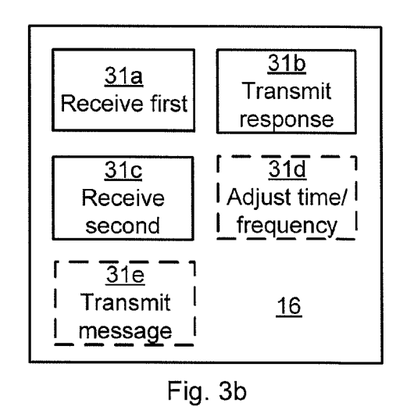
FIG. 3b is a schematic diagram showing functional modules of a receiving device according to an embodiment.

FIG. 3b schematically illustrates, in terms of a number of functional modules, the components of a receiving device 16 according to an embodiment. The receiving device 16 of FIG. 3b comprises a number of functional modules; a receive first module 31a configured to perform below step S202, a transmit response module 31b configured to perform below step S206, and a receive second module 31c configured to perform below step S208. The receiving device 16 of FIG. 3b may further comprises a number of optional functional modules, such as any of a adjust time and/or frequency module 31d configured to perform below step S204 and/or step S210, and a transmit message module 31e configured to perform below step S212. The functionality of each functional module 31a-e will be further disclosed below in the context of which the functional modules 31a-e may be used. In general terms, each functional module 31a-e may be implemented in hardware or in software. Preferably, one or more or all functional modules 31a-e may be implemented by the processing unit 31, possibly in cooperation with functional units 32 and/or 33. The processing unit 31 may thus be arranged to from the storage medium 33 fetch instructions as provided by a functional module 31a-e and to execute these instructions, thereby performing any steps as will be disclosed hereinafter.

The transmitting device 15 and/or receiving device 16 may be provided as a standalone device or as a part of a further device. For example, any of the transmitting device 15 and/or receiving device 16 may be provided in a network node 11a and/or wireless device 12. The transmitting device 15 and/or receiving device 16 may be provided as an integral part of the network node 11a and/or wireless device 12. That is, the components of the transmitting device 15 and/or receiving device 16 may be integrated with other components of the network node 11a and/or wireless device 12; some components of the transmitting device 15 and/or receiving device 16 and the network node 11a and/or wireless device 12 may be shared. For example, if the network node 11a and/or wireless device 12 as such comprises a processing unit, this processing unit may be arranged to perform the actions of the processing unit network node 11a and/or wireless device 12 of with the transmitting device 15 and/or receiving device 16. Alternatively the transmitting device 15 and/or receiving device 16 may be provided as a separate unit in the network node 11a and/or wireless device 12.

Figure 4:
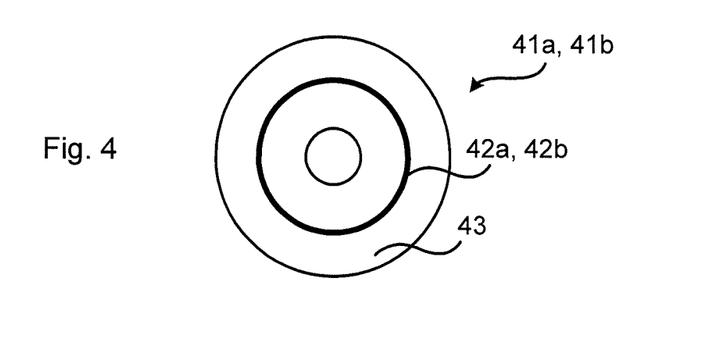
FIG. 4 shows one example of a computer program product comprising computer readable means according to an embodiment.

FIG. 4 shows one example of a computer program product 41a, 41b comprising computer readable means 43. On this computer readable means 43, a computer program 42a can be stored, which computer program 42a can cause the processing unit 21 and thereto operatively coupled entities and devices, such as the communications interface 22 and the storage medium 23, to execute methods according to embodiments described herein. The computer program 42a and/or computer program product 41a may thus provide means for performing any steps of the transmitting device 15 as herein disclosed. On this computer readable means 43, a computer program 42b can be stored, which computer program 42b can cause the processing unit 31 and thereto operatively coupled entities and devices, such as the communications interface 32 and the storage medium 33, to execute methods according to embodiments described herein. The computer program 42b and/or computer program product 41b may thus provide means for performing any steps of the receiving device 16 as herein disclosed.

In the example of FIG. 4, the computer program product 41a, 41b is illustrated as an optical disc, such as a CD (compact disc) or a DVD (digital versatile disc) or a Blu-Ray disc. The computer program product 41a, 41b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 42a, 42b is here schematically shown as a track on the depicted optical disk, the computer program 42a, 42b can be stored in any way which is suitable for the computer program product 41a, 41b.

Figure 5:
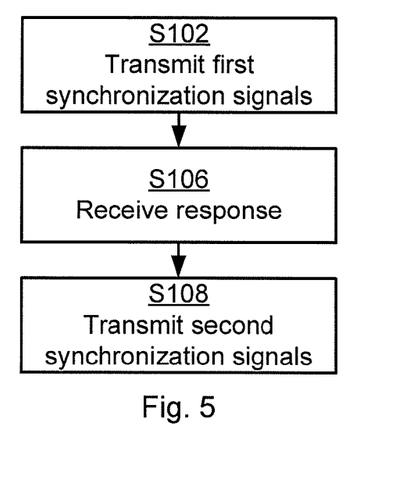
FIGS. 5, 6, 7, and 8 are flowcharts of methods according to embodiments.
Figure 6:
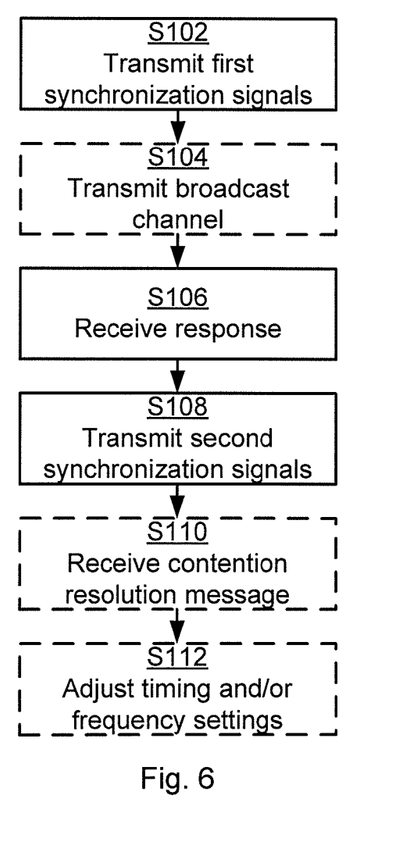
Figure 7:
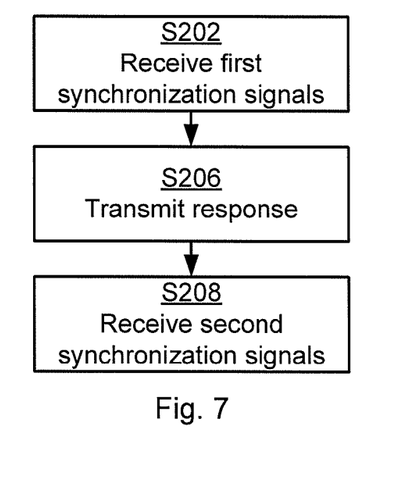
Figure 8:
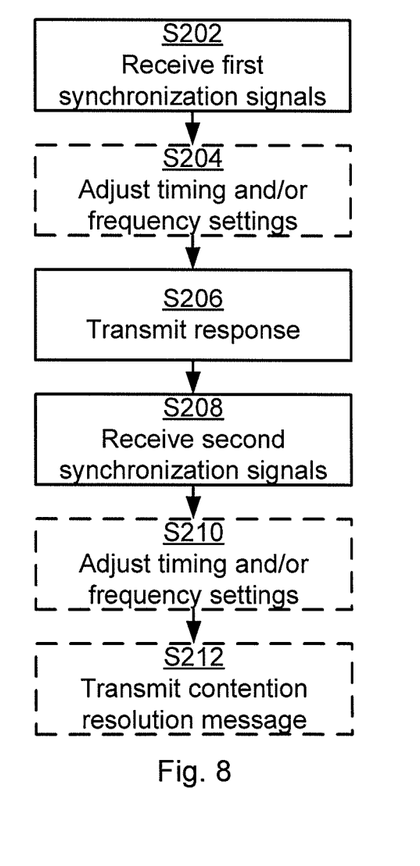

FIGS. 5 and 6 are flow charts illustrating embodiments of methods for synchronization in a wireless communications network 10a as performed by the transmitting device 15. FIGS. 7 and 8 are flow charts illustrating embodiments of methods for synchronization in a wireless communications network 10a as performed by the receiving device 16. The methods are advantageously provided as computer programs 42a, 42b.

Reference is now made to FIG. 5 illustrating a method for synchronization in a wireless communications network 10a as performed by the transmitting device 15 according to an embodiment.

The synchronization in the wireless communications network 10a is based on the transmitting device 15 transmitting two synchronization signals. Particularly, the transmitting device 15 is configured to, in a step S102, transmit a first synchronization signal on a first time/frequency resource 101, 102 in a time/frequency grid 100a, 100b. Different examples of the first synchronization signal will be disclosed below.

The transmitting device 15 then awaits a response to the first synchronization signal. Hence, the transmitting device 15 is configured to, in a step S106, receive a response to the first synchronization signal from a receiving device 16. Different examples of the response will be disclosed below.

The transmitting device 15 is further configured to, in a step S108, transmit a second synchronization signal on a first time/frequency resource 103, 104 in the time/frequency grid 100a, 100b to the receiving device 16. Different examples of the second synchronization signal will be disclosed below.

The first time/frequency resource 103, 104 spans a larger portion of the time/frequency grid 100a, 100b than the first time/frequency resource 101, 102. Different examples of how the first time/frequency resource 103, 104 may span a larger portion of the time/frequency grid 100*a*, 100*b* than the first time/frequency resource 101, 102 will be provided below.

Embodiments relating to further details of synchronization in a wireless communications network 10*a* will now be disclosed with reference now made to FIG. 6 illustrating methods for synchronization in a wireless communications network 10*a* as performed by the transmitting device 15 according to further embodiments.

As noted above, there may be different examples of first and second synchronization signals. Different embodiments relating thereto will now be described in turn.

The first synchronization signal and the second synchronization signal may be transmitted during a medium access control procedure.

According to an embodiment the first synchronization signal and the second synchronization signal are downlink synchronization signals.

Figure 11:
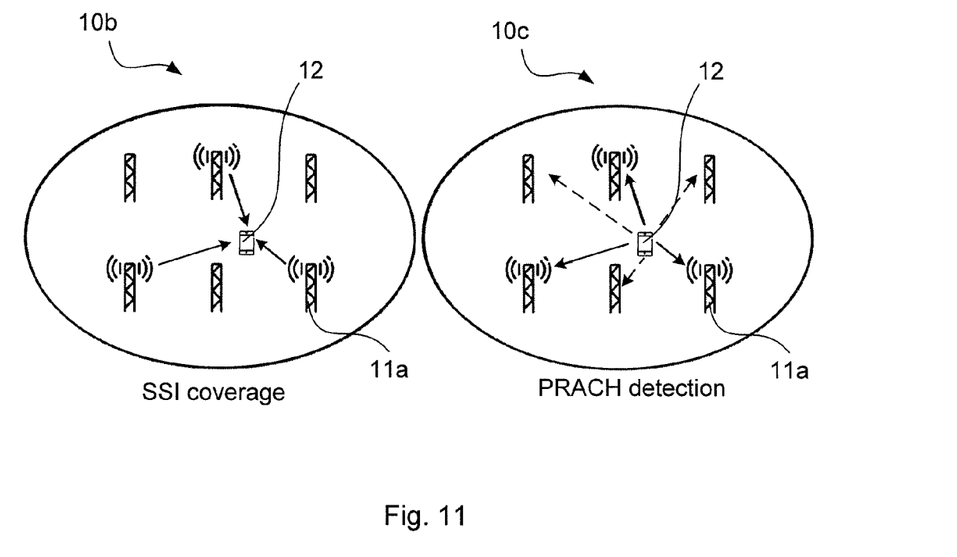
FIGS. 11 and 12 are schematic diagrams illustrating communication networks according to embodiments.

For example, the first synchronization signal may comprise a System Signature Index (SSI) to indicate system coverage for a random access procedure. The SSI may be used to provide a decoupling between the transmissions of signals indicating system presence and user data transmissions. The SSI may be transmitted to indicate system coverage for a medium access control procedure as described herein. In general terms, if the SSI is transmitted by a network node 11*a*, a wireless device 12 receiving the SSI may use the SSI to determine how to perform random access, see FIG. 11. The SSI transmission can, in some embodiments, be broadcasted from multiple transmitting devices 15 of which not necessarily all are configured for random access reception according to the random access procedure indicated by the SSI. Hence this implies that the receiving device 16 in the PRACH transmission cannot identify any particular receiver of the PRACH.

Figure 12:
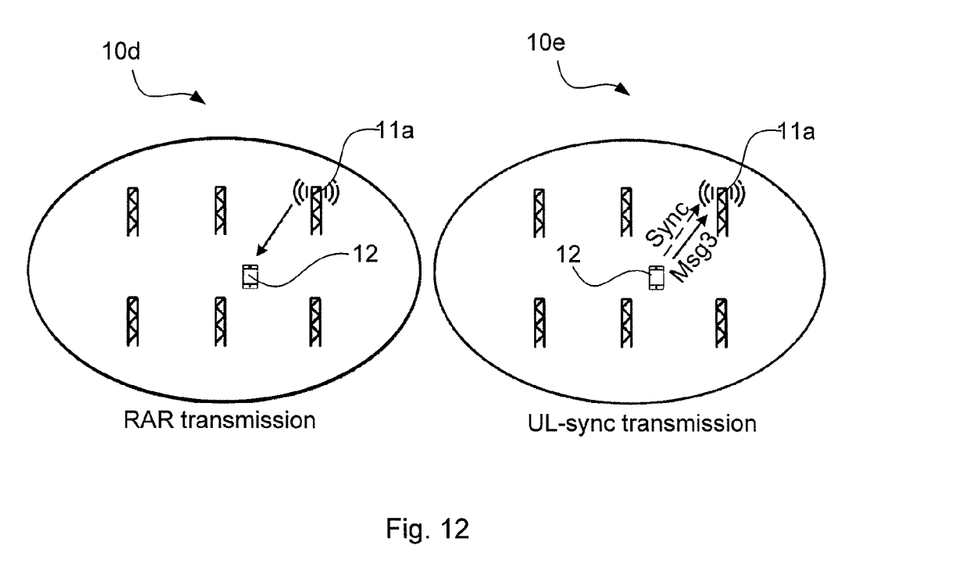

This does not prohibit that a physical random access channel (PRACH) is detected in other network node 11*a* synchronized with the at least one network node 11*a* transmitting the SSI. Although slightly worse timing of PRACH can be expected in other network node 11*a*, a single SSI may be used from multiple network node 11*a* using broadcast transmission. The timing can thus be significantly different for the network node 11*a* transmitting the SSI. This implies that for some embodiments the SSI time of arrival cannot be used as a timing/frequency reference in the downlink for the wireless device 12 in relation to the time of arrival of PRACH in a network node 11*a* detecting the PRACH. Hence, in such scenarios it may be necessary to from the network node 11*a* transmit a downlink timing reference (as provided by the second synchronization signal) to provide the wireless device 12 with a downlink time/frequency reference, see FIG. 12. As schematically illustrated in FIG. 12, when detecting the RAR transmission, which is related to a particular network node, the wireless device can hence proceed with knowledge about that particular network node when transmitting message 3. In some embodiments, the message 3 transmission also includes an uplink synchronization signal usable to the receiving device as it relates the RAR transmission.

Further, the uplink may be decoupled from the downlink. For example, there may be uplink beamforming in the wireless device 12, advance downlink beam-forming (such as massive multiple input multiple output (MIMO)), and/or a distributed antenna system that decouples or couples the uplink/downlink estimation. For such scenarios an additional uplink synchronization signal can be enabled.

In general terms, the first synchronization signal may be regarded as an initial synchronization signal. Further, the first synchronization signal may be regarded as lean in the sense that the time and frequency allocations should be as low as possible while still allowing for reliable detection. Also, the resulting time and frequency estimates should be good enough for allowing accurate decoding, e.g., of the broadcast channel. Here, communications on the broadcast channel may utilize a robust transmission scheme, e.g., with a large cyclic prefix, and/or with low coding rate and/or, low modulation order. In this way the timing and frequency accuracy do not have to be as accurate after this first synchronization as compared to the accuracy needed when receiving dedicated user data in later transmissions.

As noted above, there may be different examples of responses. Different embodiments relating thereto will now be described in turn.

According to an embodiment the response is a random access preamble. For example, the transmitting device 15 may be configured to, in a step S104, transmit a broadcast channel after having transmitted the first synchronization signal and before receiving the response.

Further embodiments relating to the first and second synchronization signals will now be described in turn.

According to an embodiment the first synchronization signal and the second synchronization signal are uplink synchronization signals. For example, the first synchronization signal may be a random access preamble. For example, the second synchronization signal may be a Random Access Response synchronization signal transmitted from the transmitting device 15 to the receiving device 16 whenever the transmitting device 15 has detected a random access preamble from the receiving device 16. For example, the second synchronization signal may be a message 3 uplink synchronization signal. For example, the received response may be a Random Access Response transmitted from the receiving device 16 to the transmitting device 15 whenever the receiving device 16 has detected a random access preamble from the transmitting device 15. For example, the second synchronization signal may be a message 3 uplink synchronization signal.

According to an embodiment the first synchronization signal and the second synchronization signal are downlink synchronization signals. For example, the first synchronization signal may be a broadcast synchronization signal. For example, the received response may be a Random Access Preamble transmitted from the receiving device 16 to the transmitting device 15 whenever the receiving device 16 has detected a downlink synchronization signals from the transmitting device 15. For example, the second synchronization signal may be a RAR synchronization signal.

Further embodiments relating to the responses will now be described in turn.

As noted above, the first synchronization signal may be a random access preamble. Therefore, the response may be a random access response. For example, the response may comprise an index of a random access preamble detected in the first synchronization signal and a result of a timing estimate from the detected random access preamble. Further, the response may further comprise a result of a frequency offset estimate from the detected random access preamble.

Figure 10:
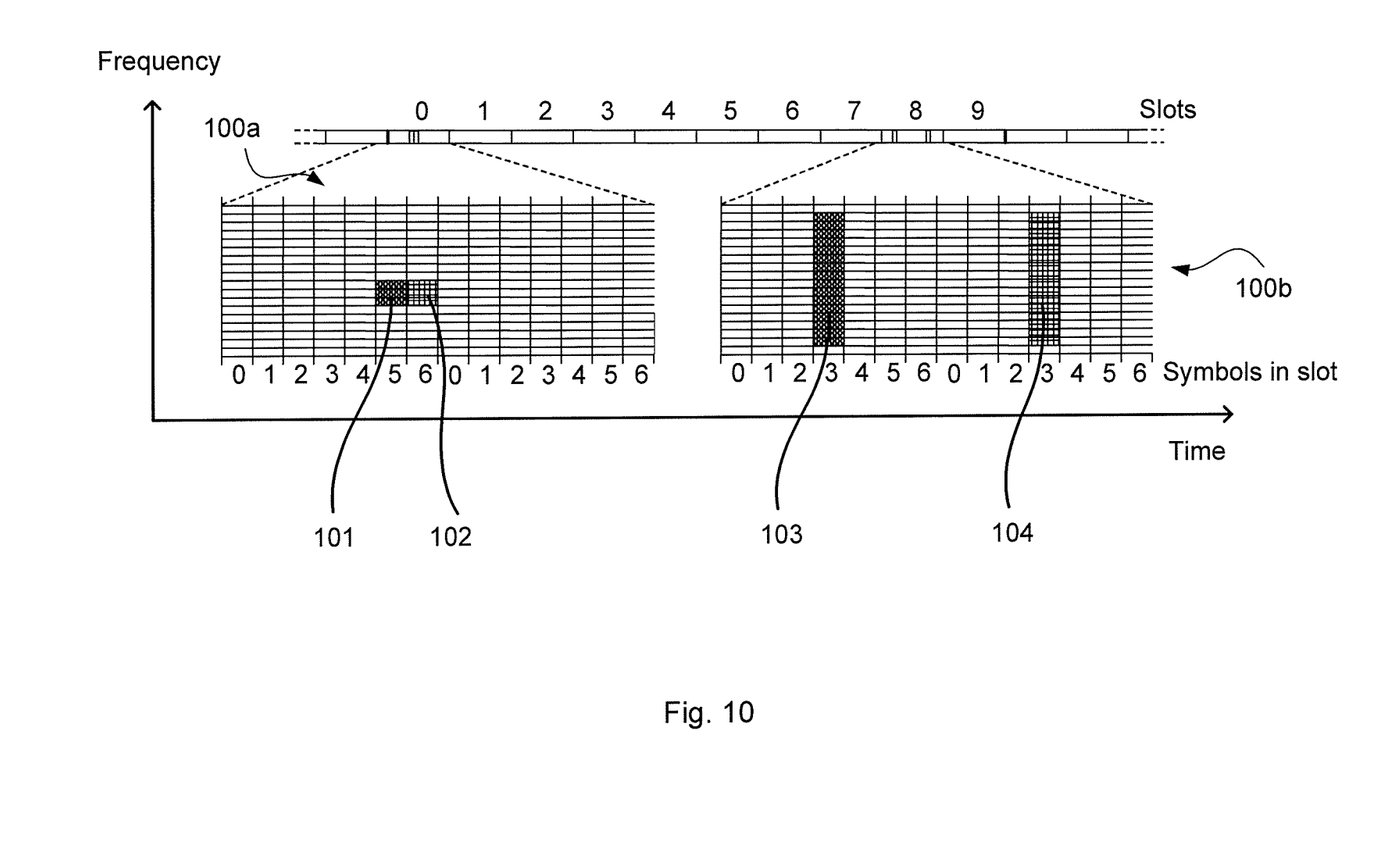
FIG. 10 is a schematic illustration of allocation of time/frequency resources according to embodiments.

Embodiments relating to different relations between the first and second synchronization signals such that the second time/frequency resource 103, 104 spans a larger portion of the time/frequency grid 100*a*, 100*b* lock than the first time/frequency resource 101, 102 will now be described in turn. FIG. 10 is a schematic illustration of allocation of time/frequency resources 101, 102, 103, 104 in a time/frequency grid 100*a*, 100*b* of symbols in slots according to embodiments. In more detail, FIG. 10 schematically illustrates an example of narrowband first synchronization signals using first time/frequency resource 101, 102 and second synchronization signals using second time/frequency resource 103, 104. The second synchronization signals have a higher bandwidth than the first synchronization signals, and the second synchronization signals have a larger separation in time than the first synchronization signals.

One embodiment concerns the span over time of the time/frequency resources. For example, the second time/frequency resource 103, 104 may span a larger time portion of the time/frequency grid 100*a*, 100*b* than the first time/frequency resource 101, 102.

One embodiment concerns the span over frequency of the time/frequency resources. For example, the second time/frequency resource 103, 104 may span a larger frequency portion of the time/frequency grid 100*a*, 100*b* than the first time/frequency resource 101, 102.

One embodiment concerns the number of time/frequency resources. For example, the second time/frequency resource 103, 104 are larger in number than the first time/frequency resource 101, 102. That is, there may be a larger number of second time/frequency resource 103, 104 than first time/frequency resource 101, 102. Alternatively, the second time/frequency resource 103, 104 are fewer in number than the first time/frequency resource 101, 102. That is, there may be a fewer second time/frequency resource 103, 104 than first time/frequency resource 101, 102.

One embodiment concerns the relative timing of the first synchronization signal and the second synchronization signal. For example, the second synchronization signal may be transmitted by the transmitting device 15 in response to the transmitting device 15 receiving the response to the first synchronization signal.

One embodiment concerns how the time/frequency resources are placed in the time/frequency grid 100*a*, 100*b*. For example, the first synchronization signal and the second synchronization signal may each comprise at least two orthogonal frequency-division multiplexing (OFDM). In one embodiment the OFDM symbols of the first synchronization signal have a first time separation and the OFDM symbols of the second synchronization signal have a second time separation which is larger than the first time separation. The first time separation may be zero. In one embodiment the OFDM symbols of the first synchronization signal have a first frequency separation, and the OFDM symbols of the second synchronization signal have a second frequency separation which is larger than the first frequency separation.

If several OFDM symbols are used for the first synchronization signal, then these OFDM symbols may be placed an adjacent each other, or at least close, in order to be able to capture large frequency errors. With a too large distance in time between the OFDM symbols, large frequency errors cannot be detected. On the other side, the accuracy of the frequency error estimate improves with increased distance in time between the OFDM symbols used for frequency offset estimation, if the frequency error is small. This can be used in the second synchronization signals, where two OFDM symbols comprised in the second synchronization signal may be placed among other OFDM symbols, as in FIG. 10.

Even further embodiments relating to synchronization in a wireless communications network ma as performed by the transmitting device 15 will now be described in turn.

Both a random access response synchronization signal and Message 3 uplink synchronization signals may not both be transmitted. Further, any of these two synchronization signals may be transmitted as a joint transmission in combination with either message 2 or 3, respectively. That is, two synchronization signals may be transmitted as a joint transmission in combination with either message 2 or 3, respectively. The second synchronization signal may thus be transmitted together with a payload message. For example, a downlink second synchronization signal in the form of a random access response can be transmitted together with a random access response message such that the reference signals and symbols containing the payload in the random access response message are transmitted together. For example, an uplink second synchronization signal in the form of a message 3 uplink synchronization signal may be transmitted jointly with a message 3.

The transmitting device 15 may further be configured to, in a step S110, receive a contention resolution message from the receiving device 16 in response to having transmitted the message 3 synchronization signal. The contention resolution message may comprise at least one of a time and a frequency offset value based on the second synchronization message. Additionally or alternatively, the contention resolution message may comprise an index of the message 3 synchronization signal. The transmitting device 15 may then be further be configured to, in a step S112, adjust at least one of internal timing and frequency settings based on the received contention resolution message.

Reference is now made to FIG. 7 illustrating a method for synchronization in a wireless communications network 10*a* as performed by the receiving device 16 according to an embodiment.

As noted above, the transmitting device 15 may in a step S102 transmit a first synchronization signal. Such a first synchronization signal may be received by the receiving device 16. Hence, the receiving device 16 is configured to, in a step S202, receive a first synchronization signal on a first time/frequency resource 101, 102 in a time/frequency grid 100*a*, 100*b* from a transmitting device 15. Examples of the first synchronization signal have been disclosed above.

The receiving device 16 responds to the first synchronization signal. Hence, the receiving device 16 is configured to, in a step S206, transmit a response to the first synchronization signal. Examples of responses have been disclosed above.

The receiving device 16 is configured to, in a step S208, receive a second synchronization signal on a second time/frequency resource 103, 104 in the time/frequency grid 100*a*, 100*b* from the transmitting device 15. Examples of the second synchronization signal have been disclosed above. The second time/frequency resource 103, 104 spans a larger portion of the time/frequency grid 100*a*, 100*b* than the first time/frequency resource 101, 102. Different examples of how the second time/frequency resource 103, 104 may span a larger portion of the time/frequency grid 100*a*, 100*b* than the first time/frequency resource 101, 102 have been provided above.

Embodiments relating to further details of synchronization in a wireless communications network 10*a* will now be disclosed with reference to FIG. 8 illustrating methods for synchronization in a wireless communications network 10*a* as performed by the receiving device 16 according to further embodiments.

There may be different ways for the receiving device 16 to act when receiving the first and/or second synchronization signals. Different embodiments relating thereto will now be described in turn.

The receiving device 16 may be configured to, in a step S204, adjust at least one of internal timing and frequency settings based on the received first synchronization signal. The receiving device 16 may be configured to perform step S204 in case the first synchronization signal is a downlink synchronization signal.

For example, the first synchronization signal may comprise a broadcast synchronization signal, and at least one of internal timing and frequency settings of the receiving device 16 may then be adjusted based on the broadcast synchronization signal. The first synchronization signal may comprise a broadcast synchronization signal in case the first synchronization signal is a downlink synchronization signal.

For example, the first synchronization signal may comprise a random access preamble, and at least one of internal timing and frequency settings of the receiving device 16 may then be adjusted based on the random access preamble. The first synchronization signal may comprise a random access preamble in case the first synchronization signal is an uplink synchronization signal.

Further, the receiving device 16 may be configured to, in a step S210, adjust at least one of internal timing and frequency settings based on the received second synchronization signal. The receiving device 16 may be configured to perform step S210 in case the second synchronization signal is a RAR synchronization signal.

As noted above, the second synchronization signal may be a message 3 synchronization signal. The receiving device 16 may then be configured to, in a step S212, transmit a contention resolution message in response to having received the message 3 synchronization signal from the transmitting device 15. The contention resolution message may comprise at least one of a time and a frequency offset value based on the second synchronization message. Additionally or alternatively, the contention resolution message may comprise an index of the message 3 synchronization signal. The contention resolution message may further comprise a result of a timing estimate from a random access preamble detected in the second synchronization signal. The contention resolution message further comprises a result of a frequency offset estimate from the random access preamble.

One particular embodiment for synchronization in a wireless communications network 10*a* based on at least some of the above disclosed embodiments will now be disclosed in detail. The particular embodiment relates to a medium access control procedure between a network node 11*a* and a wireless device 12. Reference is made to the signalling diagram of FIG. 9.

Figure 9:
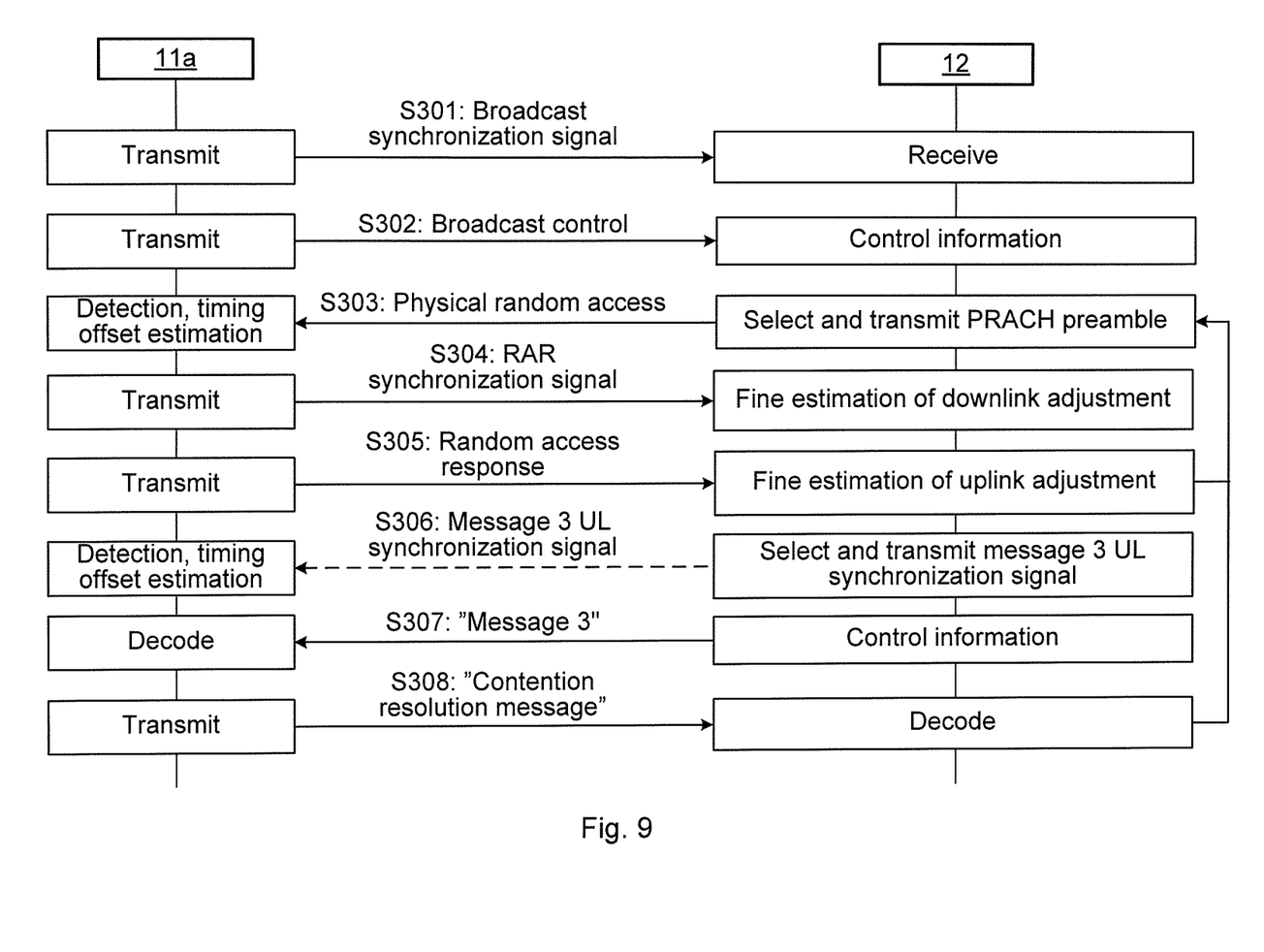
FIG. 9 is a signalling diagram according to embodiments.

Each of the network node 11*a* and the wireless device 12 may take the role of a transmitting device 15 and a receiving device 16, depending on what signals needs to be transmitted and/or received. For example, at least one of the network node 11*a* and the wireless device 12 is configured to transmit the first synchronization signal and the second synchronization signal. Hence, at least one of the network node 11*a* and the wireless device 12 is configured to receive the first synchronization signal and the second synchronization signal.

At the outset, the wireless device 12 is assumed to be powered on and hence have no timing and a frequency error of 2 to 20 ppm, corresponding to 40 to 400 kHz at a 2 GHz carrier.

S301: The network node 11*a* transmits a first set of lean broadcast synchronization signals, e.g., in the form of a first synchronization signal, for coarse time and frequency synchronization of the wireless device 12. The first synchronization signals may comprise a System Signature Index (SSI). The first synchronization signals enable the wireless device 12 to perform coarse timing estimations to provide uplink and downlink timing adjustment and/or coarse frequency offset estimation to provide uplink and downlink frequency adjustment.

S302: The network node 11*a* transmits a broadcast channel with a robust format. In this respect, the robust format may be achieved by using a large cyclic prefix, and/or low coding rate, and/or low modulation order. The wireless device 12 decodes the broadcast channel without requiring fine timing and frequency adjustment.

S303: The wireless device 12 transmits a lean random access preamble to the network node 11*a*, e.g. in the form of a first synchronization signal. The network node 11*a* detects the random access preamble and estimates its timing, e.g., using a receiver which is robust against frequency errors. The network node 11*a* may additionally or alternatively perform estimation of frequency offset of the detected random access preamble.

S304: The network node 11*a* transmits a random access response synchronization signal to the wireless device 12, e.g., in the form of a second synchronization signal. The random access response synchronization signal may be transmitted whenever the network node 11*a* has detected a random access preamble. The random access response synchronization signal enables for fine downlink time and frequency synchronizations of the wireless device 12. Hence the wireless device 12 performs fine timing estimation to provide downlink timing adjustment and/or fine frequency estimation to provide downlink frequency adjustment.

S305: The network node 11*a* transmits a random access response to the wireless device 12. The random access response may comprise an index of the detected random access preamble, and/or the results of the timing estimate from the preamble detection, and/or the result of the frequency offset estimate from the preamble detection. The wireless device 12 may adjust its timing and/or frequency accordingly. The wireless device 12 may perform decoding to acquire the uplink timing estimate to provide uplink timing adjustment, and/or decode the uplink frequency offset estimate to provide uplink frequency adjustment. Step S306 is then entered; however, alternatively, the wireless device 12 enters step S303 again.

S306: The wireless device 12 transmits a message 3 UL synchronization signal to the network node 11*a*, e.g., in the form of a second synchronization signal. The network node 11*a* detects the synchronization signal and estimates its timing and/or frequency offset.

S307: The wireless device 12 determines control information and transmits a message 3 to the network node 11*a*.

S308: The network node 11*a* transmits a contention resolution message to the wireless device 12. The contention resolution message may comprise an index of the detected message 3, and/or the results of the timing estimate from the preamble detection, and/or the results of the frequency offset estimate from the preamble detection. The wireless device 12 may adjust its timing and/or frequency accordingly. The wireless device 12 may then enter step S303 again.

The herein described synchronization procedure may become less spectral efficient in the case of a large number of accessing wireless device 12, i.e. when the random access response synchronization signal and/or message 3 uplink synchronization signal needs to be transmitted often, relative the lean broadcast synchronization signals. For at least these reasons the network node 11*a* and the wireless device 12 may switch between the described access procedure and a further access procedure, wherein the further access procedure comprises transmission of at least one additional wideband broadcasted synchronization channel and/or PRACH channel. The wireless device 12 may be configured to blindly detect which access procedure to use. Alternatively, the lean broadcast synchronization signal is used for system broadcast where the system broadcast comprises information about the PRACH format to use.

In summary, at least some of the herein disclosed embodiments provide a cell search frame format with a set of lean synchronization signals with a small resource allocation, transmitted before random access, followed by a set of synchronization signals with larger resource allocation, transmitted after random access. Further, at least some of the herein disclosed embodiments provide a lean random access allocation and random access preamble format to be used before random access response, followed by a larger random access allocation and second random access preamble to be after random access response.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although some of the examples have illustrated the herein disclosed embodiments in the context of a cellular communications system comprising at least one network node and at least one wireless device, there herein disclosed embodiments are equally applicable in other types of scenarios wireless communications networks, such as to provide synchronization during a change of radio access technology (RAT) for the wireless device 12 (e.g., from a cellular communications network to a wireless local area network, or vice versa, or between two types of cellular communications networks, or between two types of wireless local area networks), to provide synchronization for device-to-device (D2D) communications, or to provide node-to-node synchronization in a wireless backhaul network, etc.

The invention claimed is:

1. A method for synchronization in a wireless communications network, the method being performed by a transmitting device, the method comprising:
   transmitting a first synchronization signal on a first resource in a time and frequency grid;
   receiving a first response to the first synchronization signal from a receiving device;
   transmitting a second synchronization signal on a second resource in the time and frequency grid to the receiving device, wherein the second resource spans a larger portion of the time and frequency grid than the first resource; and
   receiving a second response transmitted by the receiving device in response to the second synchronization signal, wherein
   the first synchronization signal comprises a System Signature Index (SSI) to indicate system coverage for a random access procedure,
   the first response is random access preamble,
   the second synchronization signal is a Random Access Response (RAR) synchronization signal transmitted from the transmitting device to the receiving device in response to the transmitting device detecting the random access preamble, and
   the second response comprises an uplink (UL) synchronization signal related to the RAR.

2. The method according to claim 1, wherein the first synchronization signal and the second synchronization signal are downlink synchronization signals.

3. The method according to claim 1, wherein the first synchronization signal and the second synchronization signal each comprising at least two orthogonal frequency-division multiplexing, OFDM, symbols, the OFDM symbols of the first synchronization signal having a first time separation, the OFDM symbols of the second synchronization signal having a second time separation larger than the first time separation.

4. The method according to claim 1, wherein the first synchronization signal and the second synchronization signal each comprising at least two orthogonal frequency-division multiplexing, OFDM, symbols, the OFDM symbols of the first synchronization signal having a first frequency separation, the OFDM symbols of the second synchronization signal having a second frequency separation larger than the first frequency separation.

5. The method according to claim 1, further comprising:
   transmitting a broadcast channel after having transmitted the first synchronization signal and before receiving the first response.

6. The method according to claim 1, wherein the second response is a message 3 transmission.

7. The method according to claim 6, further comprising:
   transmitting a contention resolution message to the receiving device after receiving the message 3 transmission transmitted by the receiving device, the contention resolution message comprising at least one of: i) an index of the message 3 transmission, ii) results of a timing estimate from the random access preamble detection, and iii) results of a frequency offset estimate from the random access preamble detection.

8. The method according to claim 7, wherein
   the receiving device is configured to adjust at least one of internal timing and frequency settings based on the received contention resolution message.

9. The method according to claim 1, wherein the second resource spans a larger time portion of the time and frequency grid than the first resource.

10. The method according to claim 1, wherein the second resource spans a larger frequency portion of the time and frequency grid than the first resource.

11. The method according to claim 1, wherein the second resource are larger in number than the first resource.

12. The method according to claim 1, wherein the second resource are fewer in number than the first time and frequency resource.

13. The method according to claim 1, wherein the second synchronization signal is transmitted in response to receiving the first response to the first synchronization signal.

14. The method according to claim 1, wherein the first synchronization signal and the second synchronization signal are transmitted during a medium access control procedure.

15. The method according to claim 1, wherein the second synchronization signal is transmitted together with a payload message.

16. A method for synchronization in a wireless communications network, the method being performed by a receiving device, the method comprising:
   receiving a first synchronization signal on a first resource in a time and frequency grid from a transmitting device;
   transmitting a first response to the first synchronization signal;

receiving a second synchronization signal on a second resource in the time and frequency grid from the transmitting device, wherein the second resource spans a larger portion of the time and frequency grid than the first resource; and transmitting a second response to the second synchronization signal, wherein the first synchronization signal comprises a System Signature Index (SSI) to indicate system coverage for a random access procedure, the first response is random access preamble, the second synchronization signal is a Random Access Response (RAR) synchronization signal transmitted from the transmitting device to the receiving device in response to the transmitting device detecting the random access preamble, and the second response comprises an uplink (UL) synchronization signal related to the RAR.

17. The method according to claim 16, further comprising:

adjusting at least one of internal timing and frequency settings based on the received first synchronization signal.

18. The method according to claim 16, further comprising:

adjusting at least one of internal timing and frequency settings based on the received second synchronization signal.

19. The method according to claim 17, wherein the second response is a message 3 synchronization signal.

20. The method according to claim 19, further comprising:

receiving a contention resolution message in response to the message 3 synchronization signal.

21. The method according to claim 20, wherein the contention resolution message further comprises a result of a timing estimate from a random access preamble detected in the second synchronization signal.

22. The method according to claim 20, wherein the contention resolution message further comprises a result of a frequency offset estimate from the random access preamble.

23. A transmitting device for synchronization in a wireless communications network, the transmitting device comprising a processing unit, the processing unit being configured to cause the transmitting device to:

transmit a first synchronization signal on a first resource in a time and frequency grid;

receive a first response to the first synchronization signal from a receiving device;

transmit a second synchronization signal on a second resource in the time and frequency grid to the receiving device, wherein the second resource spans a larger portion of the time and frequency grid than the first resource; and receive a second response transmitted by the receiving device in response to the second synchronization signal, wherein the first synchronization signal comprises a System Signature Index (SSI) to indicate system coverage for a random access procedure, the first response is random access preamble, the second synchronization signal is a Random Access Response (RAR) synchronization signal transmitted from the transmitting device to the receiving device in response to the transmitting device detecting the random access preamble, and the second response comprises an uplink (UL) synchronization signal related to the RAR.

24. A receiving device for synchronization in a wireless communications network, the receiving device comprising a processing unit, the processing unit being configured to cause the receiving device to:

receive a first synchronization signal on a first resource in a time and frequency grid from a transmitting device;

transmit a first response to the first synchronization signal; and receive a second synchronization signal on a second resource in the time and frequency grid from the transmitting device, wherein the second resource spans a larger portion of the time and frequency grid than the first resource; and transmit a second response to the second synchronization signal, wherein the first synchronization signal comprises a System Signature Index (SSI) to indicate system coverage for a random access procedure, the first response is random access preamble, the second synchronization signal is a Random Access Response (RAR) synchronization signal transmitted from the transmitting device to the receiving device in response to the transmitting device detecting the random access preamble, and the second response comprises an uplink (UL) synchronization signal related to the RAR.

25. A computer program product comprising a non-transitory computer readable medium storing a computer program for synchronization in a wireless communications network, the computer program comprising computer code which, when run on a processing unit of a transmitting device, causes the transmitting device to:

transmit a first synchronization signal on a first resource in a time and frequency grid;

receive a first response to the first synchronization signal from a receiving device;

transmit a second synchronization signal on a second resource in the time and frequency grid to the receiving device, wherein the second resource spans a larger portion of the time and frequency grid than the first resource; and receive a second response transmitted by the receiving device in response to the second synchronization signal, wherein the first synchronization signal comprises a System Signature Index (SSI) to indicate system coverage for a random access procedure, the first response is random access preamble, the second synchronization signal is a Random Access Response (RAR) synchronization signal transmitted from the transmitting device to the receiving device in response to the transmitting device detecting the random access preamble, and the second response comprises an uplink (UL) synchronization signal related to the RAR.

26. A computer program product comprising a non-transitory computer readable medium storing a for computer program for synchronization in a wireless communications network, the computer program comprising computer code which, when run on a processing unit of a receiving device, causes the receiving device to:

receive a first synchronization signal on a first resource in a time and frequency grid from a transmitting device;

transmit a first response to the first synchronization signal;

receive a second synchronization signal on a second resource in the time and frequency grid to the receiving device, wherein the second resource spans a larger portion of the time and frequency grid than the first resource; and transmit a second response to the second synchronization signal, wherein the first synchronization signal comprises a System Signature Index (SSI) to indicate system coverage for a random access procedure, the first response is random access preamble, the second synchronization signal is a Random Access Response (RAR) synchronization signal transmitted from the transmitting device to the receiving device in response to the transmitting device detecting the random access preamble, and the second response comprises an uplink (UL) synchronization signal related to the RAR.

* * * * *

UNITED STATES PATENT AND TRADEMARK OFFICE
CERTIFICATE OF CORRECTION

PATENT NO. : 9,907,038 B2  
APPLICATION NO. : 14/429500  
DATED : February 27, 2018  
INVENTOR(S) : Sahlin et al.

Page 1 of 1

It is certified that error appears in the above-identified patent and that said Letters Patent is hereby corrected as shown below:

In the Specification

In Column 10, Line 65, delete "lock than" and insert -- than --, therefor.

In Column 11, Line 64, delete "ma" and insert -- 10a --, therefor.

In the Claims

In Column 18, Line 60, in Claim 26, delete "a for" and insert -- a --, therefor.

In Column 19, Lines 2-3, in Claim 26, delete "grid to the receiving device," and insert -- grid from the transmitting device, --, therefor.

Signed and Sealed this  
Fifth Day of June, 2018

Andrei Iancu  
*Director of the United States Patent and Trademark Office*